United States Patent
Pirner et al.

(10) Patent No.: US 6,565,218 B2
(45) Date of Patent: May 20, 2003

(54) EXTERIOR REARVIEW MIRROR FOR VEHICLES, IN PARTICULAR, MOTOR VEHICLES

(75) Inventors: Alexander Pirner, Esslingen (DE); Florin Secanu, Nürtingen (DE)

(73) Assignee: Reitter & Schefenacker GmbH & Co. KG, Esslingen (DE)

(*) Notice: Subject to any disclaimer, the term of this patent is extended or adjusted under 35 U.S.C. 154(b) by 0 days.

(21) Appl. No.: 09/849,739

(22) Filed: May 4, 2001

(65) Prior Publication Data

US 2001/0043414 A1 Nov. 22, 2001

(30) Foreign Application Priority Data

May 9, 2000 (DE) .......................................... 100 22 449

(51) Int. Cl.[7] .............................. G02B 5/08; G02B 7/18
(52) U.S. Cl. ...................................... 359/841; 248/900
(58) Field of Search ................................ 359/841, 871, 359/872, 881; 248/476, 549, 900

(56) References Cited

U.S. PATENT DOCUMENTS

| 4,679,758 A | * | 7/1987 | Boddy et al. ............... 248/479 |
| 4,740,066 A | * | 4/1988 | Whitehead .................. 248/486 |
| 4,932,766 A | * | 6/1990 | Harry ......................... 248/479 |
| 5,091,804 A | * | 2/1992 | Seitz .......................... 248/479 |
| 5,124,846 A | * | 6/1992 | Seitz et al. ................. 359/841 |
| 5,477,391 A | * | 12/1995 | Boddy ........................ 359/841 |

* cited by examiner

*Primary Examiner*—Mark A. Robinson
(74) *Attorney, Agent, or Firm*—Gudrun E. Huckett

(57) ABSTRACT

An exterior rearview mirror for vehicles has a mirror base and a mirror head connected to the mirror base so as to be pivotable in and counter to a travel direction of the vehicle. At least one lifting device imparts to the mirror head a movement away from the mirror base when the mirror head is pivoted forwardly in the travel direction. The lifting device has a lifting element connected with the mirror head and a counter element connected with the mirror base.

11 Claims, 3 Drawing Sheets

EXTERIOR REARVIEW MIRROR FOR VEHICLES, IN PARTICULAR, MOTOR VEHICLES

BACKGROUND OF THE INVENTION

1. Field of the Invention

The invention relates to an exterior rearview mirror for vehicles, preferably motor vehicles, comprising a mirror head connected to a mirror base so as to be pivotable in and counter to the travel direction of the vehicle.

2. Description of the Related Art

The mirror head of exterior rearview mirrors can be pivoted forwardly relative to the mirror base in the travel direction when impacted. In this connection, it is possible that the housing forming a cover of the mirror head comes into contact with the motor vehicle or with car body parts and is damaged in this way. This is especially disadvantageous in the case of a painted cover.

SUMMARY OF THE INVENTION

It is an object of the present invention to configure the exterior rearview mirror of the aforementioned kind such that the mirror head during forward folding in the travel direction of the motor vehicle is not damaged.

In accordance with the present invention, this is achieved in that the exterior rearview mirror is provided with at least one lifting device which imparts to the mirror head during forward pivoting in the travel direction of the motor vehicle a movement which is oriented away from the mirror base.

The exterior rearview mirror according to the invention is provided with a lifting device. It ensures that the mirror head, when it is pivoted forwardly in the travel direction of the vehicle, is simultaneously moved away from the mirror base. This ensures that the cover of the mirror head cannot come into contact with the car body and thus cannot be damaged either. Because of the lifting device, the cover can be configured such that in the position of use of the exterior rearview mirror it can extend into close proximity of the mirror base or the car body of the vehicle. The gap between the car body and the mirror head can thus be as small as possible without there being the risk that the cover comes into contact with the car body during folding of the mirror head to the front in the travel direction.

DESCRIPTION OF THE PREFERRED EMBODIMENTS

Figure 1:
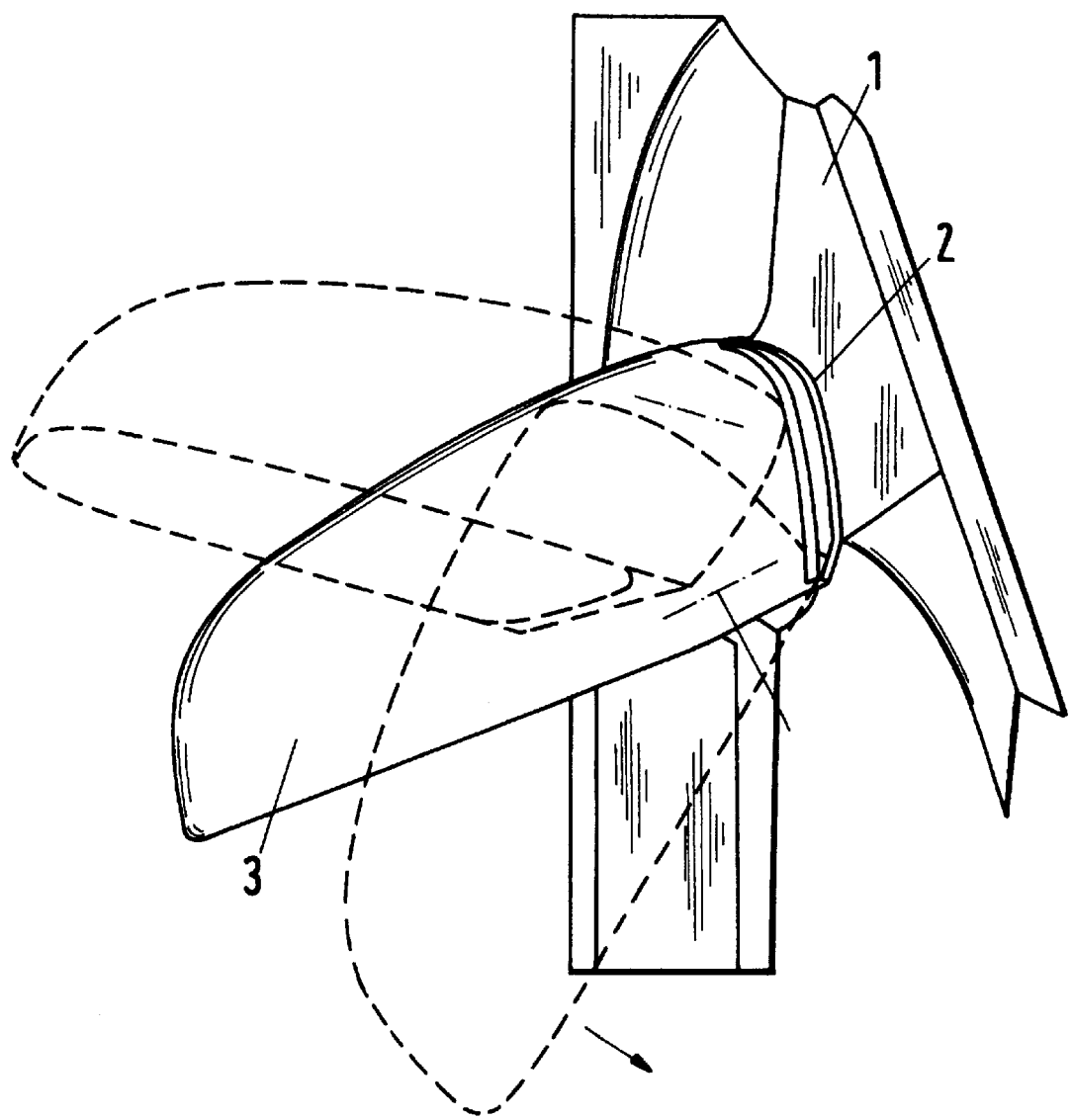
FIG. 1 is a plan view onto an exterior rearview mirror according to the present invention which is fastened to a motor vehicle door.

The illustrated embodiment shows the exterior rearview mirror fastened to a motor vehicle door 1 (FIG. 1). The exterior rearview mirror has a mirror base 2 which is fastened on the motor vehicle door 1 in a manner known in the art. A mirror head 3 is pivotably supported on the mirror base 2 which is pivotable in and counter to the travel direction F of the vehicle. In FIG. 1, the possible pivot positions of the mirror head 3 are indicated by dashed lines.

The mirror base 2 has a mirror base plate 4 with which it is connected to the motor vehicle door 1. Two brackets 5 project from the mirror base plate 4 wherein in FIG. 2 only one bracket is illustrated. The ends of an axle 6 are supported on its upper angled ends and extends approximately vertically and by which an intermediate joint 7 is pivotably supported on the mirror base 2. It is of a stirrup-shape with parallel-extending legs 8 and 9 having connected to its free ends the axle 6.

The intermediate joint 7 connects the mirror base 2 with a mirror carrier 10 of the mirror head 3. A mirror glass support, a cover as well as a drive for adjusting the mirror head 3 are supported on the mirror carrier 10.

In the travel direction F in front of the axle 6 the mirror carrier 10 is pivotably connected by means of an axle 11 with the intermediate joint 7. The axle 11 is arranged slantedly downwardly and at an acute angle forwardly relative to the travel direction F.

The mirror carrier 10 has two support elements 12 and 13 which extend in and counter to the travel direction F of the vehicle. The support element 12 oriented to the rear relative to the travel direction F, has two transversely projecting brackets 14 which, in the position of use of the mirror head, rest against the axle 6 under the force of a tension spring 15. The tension spring 15 is fastened with one end to the free end of an arm 16 which projects transversely from the mirror base plate 4. The other end of the tension spring 15 is fastened on the end of the mirror carrier 10 facing away from the mirror base 2. The tension spring 15 is arranged at the front side of the mirror carrier 10, relative to the travel direction F, in a manner known in the art and projects through an opening 17 in the mirror carrier 10 to the opposite side of the mirror carrier 10. As a result of the force of the tension spring 15, the mirror head 3 is fixedly pulled against the mirror base 2 in the position of use.

On the support element 13 of the mirror carrier 10 pointing in the forward direction relative to the travel direction F, there are also two brackets 18 which are oriented in the direction toward the mirror base plate 4 and through which the pivot axis 11 extends.

Between the mirror base 2 and the mirror head 3, a lifting device 19 is provided which makes it possible that the mirror head 2 is lifted away from the mirror base 2 during folding in the travel direction F. This prevents that the cover surrounding the mirrorcarrier 10 during this folding action will come into contact with the mirror base 2 and is thereby damaged. The lifting device 19 has a ramp 20 provided on the mirror base plate 4 which projects perpendicularly from the mirror base plate 4 and has a ramp surface 21 ascending in a direction counter to the travel direction F. It extends from the side of the motor vehicle in a direction counter to the travel direction F at a slant to the rear. A lever 22 rests against the ramp surface 21 which is provided on the mirror carrier 10. In the embodiment, it projects from the underside of the support element 13 facing the mirror base 2. The lever 22 is preferably curved over its length. The lever 22, beginning at the support element 13, is forwardly curved in the direction toward the mirror base plate in the travel direction F. The end face 23 of the lever 22 is curved approximately in a semi-circular shape so that the lever 22 during pivoting of the mirror head 3 in the travel direction F is easily moved to the front on the plane ramp surface 21. The lever 22 extends through the intermediate joint 7.

In the position of use, the mirror head 3 with the brackets 14 of its support elements 12 rests under the force of the tension spring 15 on the axle 6. Moreover, the intermediate joint 7 rests with short brackets 24, projecting from its legs 8, 9 in the direction toward the mirror base 2, under the force of the tension spring 15 against brackets 25 which project from the mirror base plate 4. The intermediate joint 7 is pivoted about the axle 6 to such an extent that the lever 22 rests against the ramp 20 (FIG. 2) on the end of the ramp surface 21 neighboring the motor vehicle.

When a force acts on the mirror head 3 in the travel direction F, for example, as a result of an impact on the mirror head, the mirror head 3 is pivoted relative to the mirror base 2 in the travel direction F to the front. When doing so, the mirror head 3 pivots about the axle 11 in the travel direction F to the front. The lever 22 then glides along the ramp surface 21 away from the mirror base 2. Accordingly, the intermediate joint 7 is pivoted about the axle 6 counter to the mirror carrier 10. The mirror carrier 10 is lifted off the motor vehicle door (FIG. 1) so that the cover of the mirror head 3 reaches a sufficient spacing from the motor vehicle door. A damage of the generally painted cover by contact on motor vehicle parts is thus reliably prevented.

Since the lever 22 in the area between the two pivot axles 6 and 11 penetrates the intermediate joint 7, the constructive size of the exterior rearview mirror is not increased by the lifting device 19. The lever 22 and the ramp 20 are provided in a space-saving way on the mirror base plate 4 and do not project past its contour. The brackets 5, 25, the arm 16, and the ramp 20 project past the same side of the mirror base plate 4 in the direction toward the mirror head 3.

Figure 2:
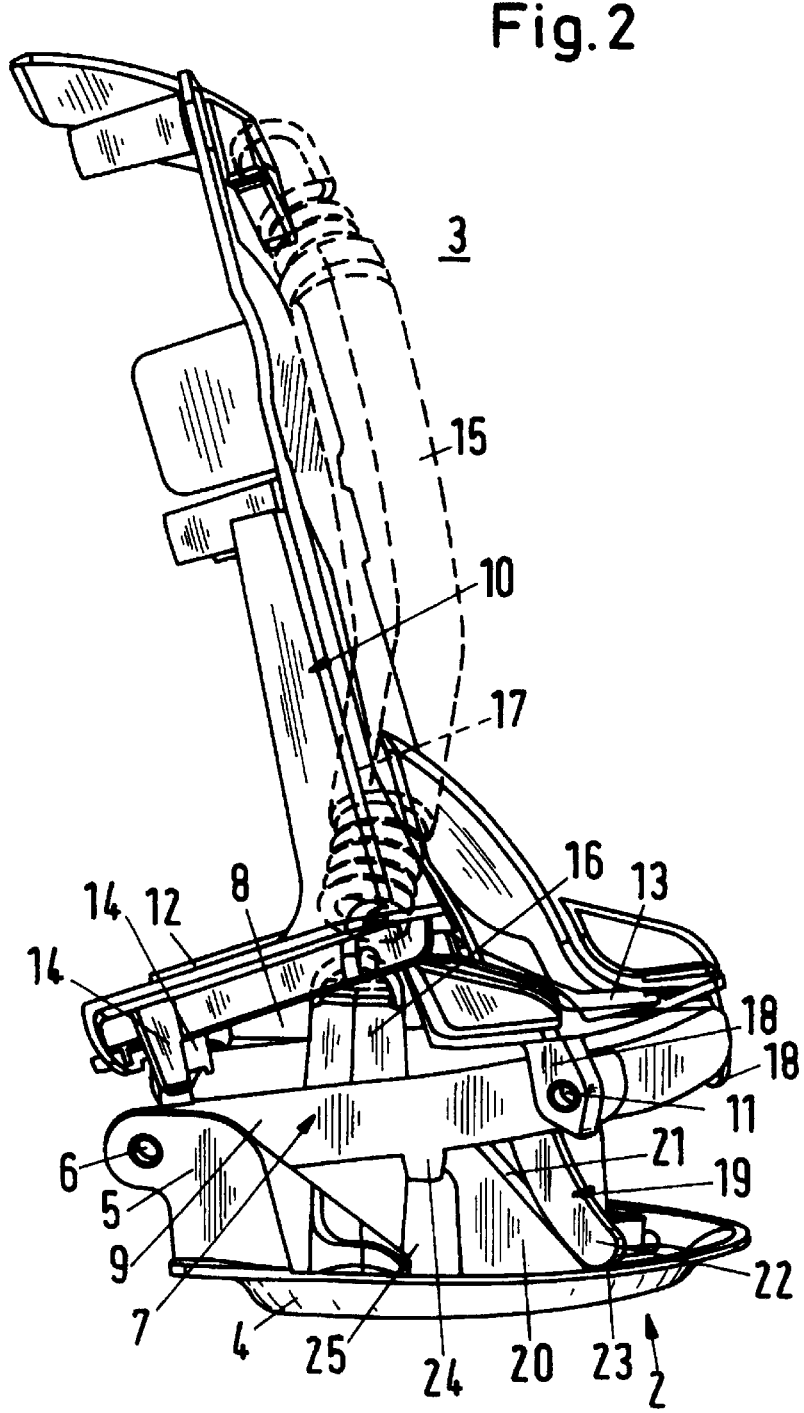
FIG. 2 shows the exterior rearview mirror according to FIG. 1 whose mirror head and mirror base are illustrated without cover.
Figure 3:
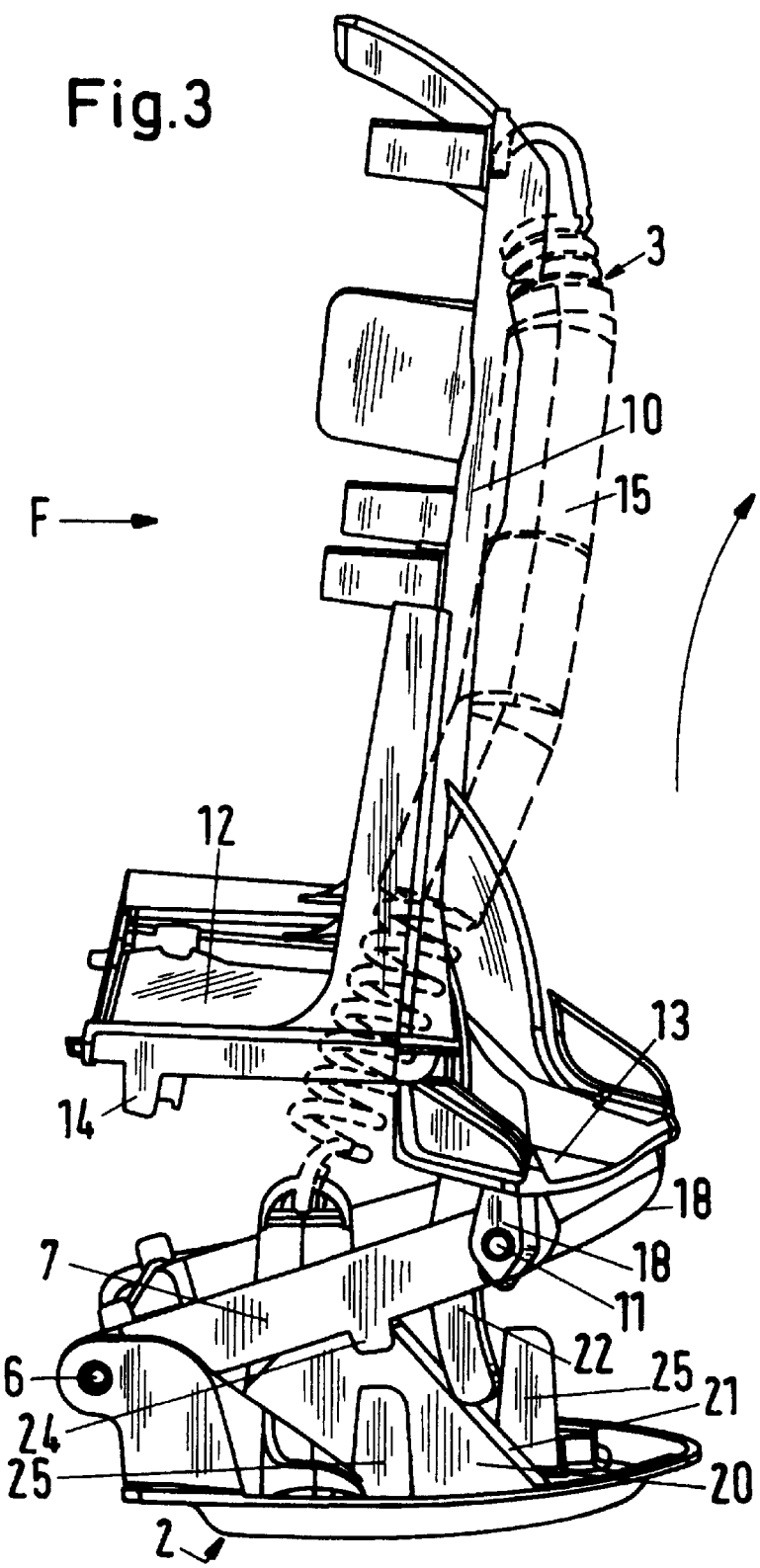
FIG. 3 is a mirror carrier of the mirror head of the exterior rearview mirror according to the invention in the folded position.

As soon as the force action on the mirror head 3 ends, the mirror head is pivoted back by the force of the tension spring 15 into the position of use according to FIG. 2. The intermediate joint 7 pivots about the axle 6 while the mirror carrier 10 is pivoted back about the axle 11 counter to the intermediate joint 7 into the initial position according to FIG. 2. When doing so, the lever 22 glides along the ramp surface 21 into the initial position.

The lifting device 19 does not impair the folding movement of the mirror head in the parking position. It is reached in that the mirror head 3 is pivoted to the rear about the axle 6 relative to the travel direction F. The brackets 14 of the mirror carrier 10 rest against the axle 6 under the force of the tension spring 15. When pivoted back, the lever 22 is lifted off the ramp 20 of the lifting device 19. This folding movement is carried out advantageously in a known manner by a motor. During pivoting back of the mirror head 3 from the parking position into the position of use the lever reaches again the ramp surface 21.

The lifting device 19 ensures that, during folding of the mirror head 3 to the front in the travel direction F, simultaneously two oppositely oriented pivot movements are performed so that the mirror head 3 can be reliably moved away from the motor vehicle parts in the described way.

While specific embodiments of the invention have been shown and described in detail to illustrate the inventive principles, it will be understood that the invention may be embodied otherwise without departing from such principles.

What is claimed is:

1. An exterior rearview mirror for vehicles, said exterior rearview mirror comprising:

a mirror base (2);

a mirror head (3) connected to said mirror base (2) so as to be pivotable in and counter to a travel direction (F) of the vehicle;

at least one lifting device (19) configured to impart to said mirror head (3) a movement away from said mirror base (2) when said mirror head (3) is pivoted forwardly in said travel direction (F);

said at least one lifting device (19) comprising a lifting element (22) connected to said mirror head (3) and a counter element (20) connected to said mirror base (2), wherein said counter element is a ramp (20) having a planar ramp surface (21) ascending in a direction counter to the travel direction away from said mirror base (2) and configured to guide said lifting element (22).

2. The exterior rearview mirror according to claim 1, wherein said lifting element (22) is a lever oriented in a direction to said mirror base (2).

3. The exterior rearview mirror according to claim 1, wherein said lifting element (22) is curved from end to end.

4. The exterior rearview mirror according to claim 3, wherein said lifting element (22) is curved forwardly in said travel direction (F).

5. The exterior rearview mirror according to claim 1, wherein said ramp surface (21) is positioned in a plane extending from said mirror base (2) at a slant rearwardly counter to said travel direction (F) and being positioned approximately vertically.

6. The exterior rearview mirror according to claim 1, wherein said mirror base (2) comprises a mirror base plate (4) and wherein said counter element (20) projects from said mirror base plate (4).

7. The exterior rearview mirror according to claim 1, further comprising an intermediate joint (7) connecting said mirror head (3) and said mirror base (2) to one another.

8. The exterior rearview mirror according to claim 7, wherein said intermediate joint (7) comprises a first axle (6) and is connected to said mirror base (2) so as to be pivotable about said first axle (6) relative to said mirror base (2).

9. The exterior rearview mirror according to claim 8, wherein said intermediate joint comprises a second axle (11) positioned at a spacing from said first axle (6) in said travel direction (F), wherein said mirror head (3) has a mirror carrier (10), and wherein said intermediate joint (7) is connected to said mirror carrier (10) so as to be pivotable about said second axle (10) relative to said mirror carrier (10).

10. The exterior rearview mirror according to claim 7, wherein said mirror head (3) has a mirror carrier (10), wherein said intermediate joint (7) and said mirror carrier (10) pivot in opposite directions, when said mirror head (3) is pivoted forwardly in said travel direction (F).

11. The exterior rearview mirror according to claim 10, wherein said intermediate joint (7) comprises a first axle (6) and is connected to said mirror base (2) so as to be pivotable about said first axle (6) relative to said mirror base (2) and wherein said intermediate joint (7) comprises a second axle (11) positioned at a spacing from said first axle (6) in said travel direction (F), wherein said intermediate joint (7) is connected to said mirror carrier (10) so as to be pivotable about said second axle (11) relative to said mirror carrier (10), wherein said intermediate joint (7) pivots rearwardly about said first axle (6) relative said travel direction (F) and said mirror carrier (10) pivots forwardly about said second axle (11) in said travel direction (F).

* * * * *